Figure 1:
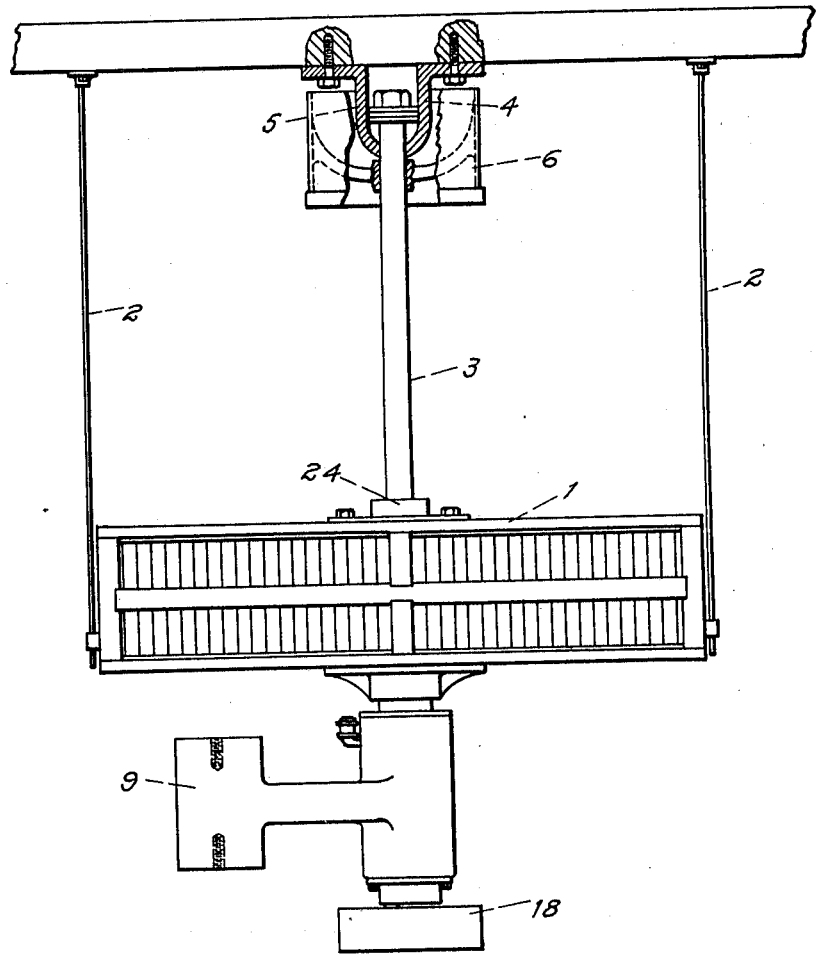

R. A. REYNOLDS.
FLOUR BOLTER.
APPLICATION FILED OCT. 26, 1911.

1,022,381.

Patented Apr. 2, 1912.
2 SHEETS—SHEET 1.

WITNESSES.
Paul A. R. Kroesing.
Lotta Lee Bray.

INVENTOR
Robert A. Reynolds
by Balgernard A. Parkin
Attorneys.

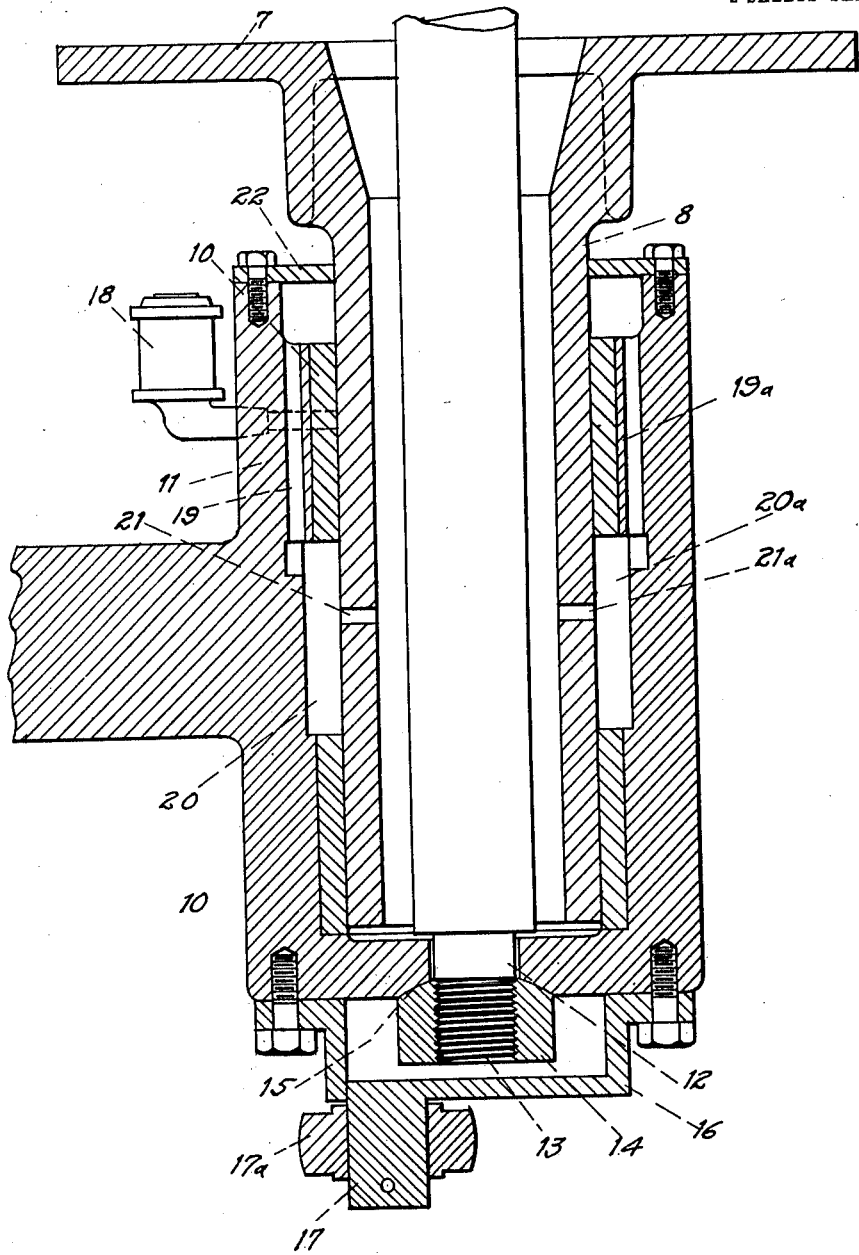

UNITED STATES PATENT OFFICE.

ROBERT A. REYNOLDS, OF DETROIT, MICHIGAN, ASSIGNOR TO THE AMERICAN MACHINERY COMPANY, OF PORT HURON, MICHIGAN, A CORPORATION OF MICHIGAN.

FLOUR-BOLTER.

1,022,381.   Specification of Letters Patent.   Patented Apr. 2, 1912.

Application filed October 26, 1911. Serial No. 656,885.

*To all whom it may concern:*

Be it known that I, ROBERT A. REYNOLDS, a citizen of the United States, residing at Detroit, county of Wayne, State of Michigan, have invented a certain new and useful Improvement in Flour-Bolters, and declare the following to be a full, clear, and exact description of the same, such as will enable others skilled in the art to which it pertains to make and use the same, reference being had to the accompanying drawings, which form a part of this specification.

My invention relates to bolters and has for its object an improved bolter operated by a shaft and an eccentric weight so arranged thereon that the weight keeps horizontal and uniform planes of rotation, regardless of the inclination of the shaft. The eccentric weight is also adjustable lengthwise of the shaft. Provision is also made for the free and adequate lubrication of the parts, and the shaft is suspended from a universal bearing and revolves on a bearing member fast to the sieve case.

Figure 1, is an elevation of a bolter, showing the upper bearing and pulley in section. Fig. 2, is a vertical cross section through the hub of the weight, the bearing member and the bushings, showing the shaft in elevation.

The construction of the sieve case 1 and the sieves contained therein, is not shown in the drawings and will not be described, as it is well known in the art, and it is no part of my invention. The sieve case is suspended from the ceiling or a support by flexible rods 2 and the shaft 3 has a universal connection with the ceiling by means of the acorn bearing 4 and the rings 5 fast on the shaft 3. The shaft is driven by the pulley 6 and below the sieve case, is the bearing member 7, having a quill 8 incasing the shaft almost its entire length. This quill acts as a bearing for the revolving weight 9 and a brass bushing 10 is interposed between the hub 11, to which the weight is integral, and the quill. The bottom of the hub 11 has a prismatic aperture 12, through which the prismatic shaft passes. The end 13 of the shaft is screw-threaded and upon these threads runs a nut 14, having a zonular or part spherical upper face 15. The rim of the aperture 12 is countersunk and provided with a zonular or part spherical surface complementary to the zonular or part spherical face of the running nut 14. A cap 16 is bolted to the bottom of the hub 11 and provided with a guide pin 17 which engages in the guide pin 18, and carries a wheel 17ª to avoid friction. This limits the amount of gyration that is possible.

Lubrication is provided from the oil cup 18, which has an opening into the oil-duct 19 of the hub 11. The bushing 10 is provided with a canal 20 in which the oil-duct 19 opens and from thence the oil is free to flow into the interior of the hub about the shaft, thence through openings 21 and 21ª, rise on the other side of the shaft through the canal 20ª and the duct 19ª. The annular cap-plate 22 is bolted to the top of the sleeve and keeps the oil in the parts free from dust and other foreign matter.

As the shaft revolves the eccentric weight 9 is thrown outward by centrifugal force, causing the shaft to assume a gyrating movement, which is communicated to the bearing member and thence to the sieve case, but the weight travels in even horizontal planes, as its connection to the shaft 3 gives it a slight freedom of movement upon the spherical bearing 15 of the nut 14 and it may slide vertically on the bearing member. The above described construction affords an evenness in the running of the shaft and the action of the bolter, which has not heretofore been accomplished. The gyration of the shaft 3 is necessarily limited by the guide pit 18 and inasmuch as the rods 2 are flexible the sieve case 1 has all the freedom of movement necessary.

What I claim is:—

1. In a bolting machine, an eccentric weight provided with a hub having a prismatic aperture and a zonular countersunk rim therefor, a shaft suspended from a flexible bearing, having a prismatic portion passed through said aperture and slightly spaced therefrom and terminating in a threaded portion, and a nut having a zonular face engaging complementarily with said countersunk rim of the aperture, substantially as described.

2. In a bolting machine, a shaft suspended from a flexible bearing, a sieve case suspended flexibly from above, a bearing member having a quill incasing parts of said shaft, an eccentric weight having a hub journaled on said quill, and a guide pin on the lower end of the hub, adapted to travel in a pit therefor and limit the gyration of said shaft, substantially as described.

3. In a bolter, the combination of an eccentric weight, a swinging and revolving shaft, means by which the shaft may be revolved, a part-spherical bearing holding said eccentric weight on the shaft and a driving connection between the shaft and weight adapted to allow the weight to change its position with respect to the shaft, substantially as described.

4. A bolter, having in combination, a sieve case swingingly suspended from the ceiling, a flexible bearing fixed to the ceiling, a gyratory shaft suspended from the bearing, a bearing member attached to the sieve case, an eccentric weight revoluble on said bearing and loose driving connections between the said shaft and eccentric weight, substantially as described.

5. A bolter, having in combination, a sieve case swingingly suspended from the ceiling, a flexible bearing fixed to the ceiling, a gyratory shaft suspended from said bearing, a bearing member attached to the sieve case, an eccentric weight revoluble on said bearing member and loosely hung on and driven by said shaft so as to slide vertically on said bearing member, whereby the weight always revolves in a plane parallel to the sieve case, substantially as described.

6. A bolter, having in combination, a sieve case swingingly suspended from the ceiling, a flexible bearing fixed to the ceiling, a gyratory shaft suspended from the said bearing, a bearing member attached to the sieve case, an eccentric weight revoluble and slidable on said bearing member and a part spherical bearing for holding said eccentric weight on said shaft, the said weight having a loose drive connection with the shaft, substantially as described.

7. A bolter, having in combination, a swingingly suspended sieve case, a gyratory shaft, a flexible bearing fixed to the ceiling in which said shaft is revolubly suspended, an eccentric weight revolved by said shaft, means for hanging said weight on said shaft so that the weight will revolve in uniform planes although the shaft is inclined from the vertical, and means for communicating the gyration of the weight to the sieve case, substantially as described.

8. A bolter, having in combination, a swingingly suspended sieve case, a gyratory shaft inclining from the vertical in its gyration, an eccentric weight driven by the shaft and adapted to cause the shaft to gyrate, a part spherical bearing adapted to support the wieght on the shaft and means for communicating the gyration of the shaft to the sieve case, substantially as described.

In testimony whereof, I sign this specification in the presence of two witnesses.

ROBERT A. REYNOLDS.

Witnesses:
VIRGINIA C. SPRATT,
STUART C. BARNES.

---

Copies of this patent may be obtained for five cents each, by addressing the "Commissioner of Patents, Washington, D. C."